United States Patent [19]

Morgan

[11] Patent Number: 5,281,428
[45] Date of Patent: Jan. 25, 1994

[54] METHOD AND APPARATUS FOR TREATING AND PACKAGING RAW MEAT

[76] Inventor: Arthur I. Morgan, 600 E. Mermaid Ln., Philadelphia, Pa. 19118

[21] Appl. No.: 40,975

[22] Filed: Mar. 31, 1993

[51] Int. Cl.⁵ .............................................. A23B 4/00
[52] U.S. Cl. ...................... 426/312; 99/472; 99/516; 426/511; 426/521
[58] Field of Search ............... 426/312, 404, 486, 511, 426/521, 644; 99/472, 516; 141/65, 66

[56] References Cited

U.S. PATENT DOCUMENTS

| | | | |
|---|---|---|---|
| 3,934,044 | 1/1976 | Busch | 426/326 |
| 3,996,386 | 12/1976 | Malkki et al. | 426/321 |
| 4,636,395 | 1/1976 | Robinson, Jr. et al. | 426/511 |
| 4,760,780 | 8/1988 | Silvestrini et al. | 99/516 |
| 4,902,522 | 2/1990 | Rudibaugh | 99/472 |
| 5,043,175 | 8/1991 | Bayley et al. | 426/521 |

FOREIGN PATENT DOCUMENTS

2603775  3/1988  France .................. 426/312

Primary Examiner—George Yeung
Attorney, Agent, or Firm—Richard C. Litman

[57] ABSTRACT

A method and apparatus for killing microorganisms on the surface of raw meat. The microorganisms are killed by exposing the meat to controlled applications of a biocidal treatment gas in a vacuum/pressure regulated environment. The meat is first exposed to a vacuum, the surface then flushed with an air-free treatment gas, then full treated with the air-free treatment gas, and then reexposed to a vacuum. The method and apparatus successfully kills microorganisms on the surface and pores of raw meat without causing significant deleterious changes to the meat.

20 Claims, 8 Drawing Sheets

METHOD AND APPARATUS FOR TREATING AND PACKAGING RAW MEAT

BACKGROUND OF THE INVENTION

1. Field of the Invention

The present invention relates generally to processes and apparatuses for sterilizing porously surfaced materials, and more particularly, to a method and a device for killing microorganisms on raw meat through controlled applications of a biocidal treatment gas in a vacuum/pressure regulated environment.

2. Description of the Prior Art

Prior to slaughter, the muscles of healthy food animals normally do not contain microorganisms toxic to humans. The animal's gastrointestinal tract, will however harbor several species of microorganisms. Typically, the host of gastrointestinal microorganisms found in animals will include numerous species of bacteria. Enterobacteria such as Salmonella is especially prevalent. While these microorganisms are generally not harmful to the animal, several species will produce toxic reactions in humans.

Unfortunately, an essential part of slaughter is the cutting and removal of an animal's gastrointestinal tract. Not surprisingly, the tract's contents are often spilled and smeared onto the meat surface during and after slaughter. Further contributing to bacterial contamination, gastrointestinal tract contents are often spread from the surface of one animal to another as a result of successive handling by slaughterhouse workers. Contamination can also occur during successive machine-processing steps and when meat pieces are sequentially dipped in various liquid treatment baths. Generally, surface-to-surface contamination can occur throughout every stage in any standard meat slaughtering, processing and packaging assembly-line.

As pointed out in U.S. Pat. No. 3,934,044 (granted to Busch et al. on Jan. 20, 1976) many techniques have been employed in the past for treating meat and meat-cuts to destroy surface bacterial flora. As noted by Busch, however, all of these techniques have suffered from one or more of the following problems: (1) denaturation of meat protein, (2) insufficient bacterial kill, (3) deleterious color change, (4) unacceptable flavor modification, and (5) inadequate control of the process in large scale operations.

The problems enumerated by Busch are evident in several other previous and subsequent patents. For example, U.S. Pat. No. 3,996,386 (granted to Malkki and Nikilla on Dec. 7, 1976) attempts to prevent microbial surface deterioration of foods by spraying the surface of such foods with a preservative in the form of a fine particulate aerosol. As preservatives, Malkki and Nikilla suggest such compounds as chlortetracycline, chloramphenicol, sodium o-phenyl phenolate and others. While Malkki and Nikilla's process provides a means for countering surface bacterial growth, the process still inherently results in a chemically coated food substance, despite Malkki and Nikilla's decided efforts to minimize the actual amounts of preservatives used. Accordingly, potential exists for chemical interactions leading to deleterious color change and/or unacceptable flavor modification.

In the same vein, U.S. Pat. No. 4,636,395 (granted to Robinson, Jr. and Egee on Jan. 13, 1976) describes a method for heat treating the surface area of raw meats by rapidly elevating the temperature of the meat followed immediately by rapid cooling. Although Robinson and Egee do not use taste and/or color modifying preservatives, their process is delicately balanced between the competing objectives of maximizing sufficient bacterial kill, on the one hand, and preventing the denaturation of meat protein, on the other. Having very few safeguards, it is believed that the balance struck by Robinson and Egee is one that can be consistently maintained only with difficulty and constant vigilance. In actual practice, one objective will often have to give way to the other.

As for the Busch process itself, U.S. Pat. No. 3,934,044 indeed attempts to correct the several noted problems. Busch describes a process directed at destroying psychotropic spoilage bacteria on meat or meat-cuts without adversely affecting the color, flavor or aroma of the meat by applying a hot, dilute acid solution to meat surfaces for a brief period of time. However, in the attempt to correct the inherent problems associated with the sterilization of meat products, Busch overlooks a problem that was identified by Malkki and Nikilla in their later patent.

The problem was rooted in the pores, irregularities and other imperfections found on the surface of meat. Such pores and irregularities will often serve as fertile grounds for the development of bacterial growth. Further frustrating the success of conventional sterilization procedures, the removal of surface contamination from meat has proven difficult due also to the strong adhesion of microorganisms to the meat surface. When a wash or spray is used, many organisms tend to escape. While better results were achieved with the addition of bactericides to the spray or wash water, the improvement was slight. Even with the use of concentrated and powerful bactericides, a significant number of organisms still often survived. This occurred even when the exposure time and bactericide concentration were more than adequate to sterilize, a smooth, simple surface.

In accordance with the present invention, the failure of conventional processes may be ascribed to chemical and physical attributes of the solvent, water. Generally, water cannot reach deep contaminated surfaces because of its high surface tension. Many other solvents used for microbial kill exhibit similarly high surface tension. The folds, cavities, and pores are often large enough to contain bacteria; but too small to admit a liquid wash or spray. An impractically high wash pressure would be needed to overcome the capillary pressure in pores having dimensions just large enough to contain bacteria.

Many species of microorganisms are small relative to the surface irregularities in which they live. Many parts of the muscles are about the same size as the target organisms, $2 \times 10^{-6}$m. Poultry muscle fibers, for example, are about $20 \times 10^{-6}$m in diameter; and these each consist of three distinct sheaths, covering many of the much finer fibrils. These fibrils are generally of two kinds: Thick and thin. The thick fibrils are $0.1 \times 10^{-6}$m wide and $2 \times 10^{-6}$m. long. The thin fibrils are $0.05 \times 10^{-6}$m. wide and $0.4 \times 10^{-6}$m. long. In addition, there are several other structures, such as Z discs, mitochondria, capillaries, and cell nuclei in the muscles, capable of obscuring the targets. Furthermore, certain toxic bacteria, such as Salmonella, have short flagella on their surface which may entangle with the meat fibers or fibrils. In view of this, one can appreciate the difficulties inherent in cleaning meat products.

It is in light of the above, that the present invention was designed. In the most general sense, the present invention provides a means to kill microorganisms without damaging the meat product itself. None of patents discussed above, taken either singly or in combination, describe or suggest the instant invention as claimed.

SUMMARY OF THE INVENTION

This invention relates to the processing of meat pieces to kill substantially all toxic microorganisms living on the surface and pores of such meat. The process involves the highly controlled exposure of meat to a biocidal treatment gas capable of killing microorganisms without leaving a toxic residue on the meat or producing any other undesired changes in the quality of the meat.

It is noted that the present invention seeks to kill the targets in place; rather than try to remove them. In general, dead enterobacteria are not harmful to humans. These bacteria do not form spores, nor do they produce any toxins which act after their death, as do some Clostridia.

In view of the above, it is an object and purpose of the invention to convert meat pieces contaminated with gastrointestinal microorganisms during slaughter and processing into surface pasteurized meat pieces incapable of causing disease and incapable of causing contamination of other foods during distribution, sale, storage, preparation, or consumption.

It is a further object of the present invention to provide a meat sterilization process which avoids making any change in the interior of the meat piece.

It is a further object of the present invention to provide a process that may be used to treat uniformly any surface with a gas in a way that is both begun and ended so abruptly as to have no appreciable effect on the solid below the surface so treated.

It is a further object of the present invention to kill the microorganism where they live and breed; rather than try to physically remove them.

With these and other objects in view which will more readily appear as the nature of the invention is better understood, the invention consists in the novel construction, combination and assembly of parts hereinafter more fully described, illustrated and claimed with reference being made to the attached drawings.

DETAILED DESCRIPTION OF THE INVENTION

The invention will now be further discussed with reference to the figures.

I. The Process

Figure 1:
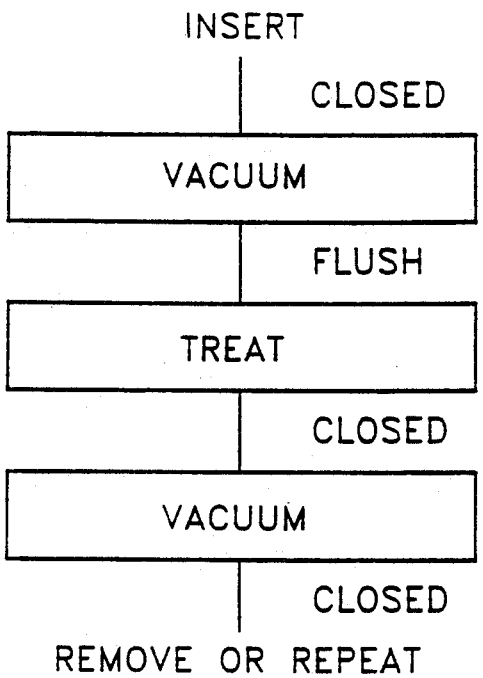
FIG. 1 is a flow chart generally outlining the basic steps involved in the present meat treating process.

FIG. 1 provides a flow chart which generally outlines the four basic steps in killing microorganisms on the surface of meat products. As shown in FIG. 1, the first step involves exposing the meat product to a vacuum. The second step involves flushing the meat surface with a treatment gas. The third step involves treating the meat with the treatment gas. The fourth step involves exposing the meat again to a vacuum.

In accordance with this invention, the treating substance applied is a gas, such as steam, ozone, hydrogen peroxide or propylene oxide. Use of such gases avoids the difficulties concerning penetration into surface irregularities to effect microbial kill: Due to their size, these gases can enter any cavity large enough to contain a bacterium. Other gases displaying similar properties may be used. To this end, it is noted that Salmonellae are short, straight rods, about $0.7 \times 10^{-6}$m. in thickness and $4 \times 10^{-6}$m long. Simple gas molecules are typically $2 \times 10^{-10}$m. in diameter; hence 10,000 times smaller than a bacterium. Gas condensation velocity is reduced only in cavities of diameter shorter than the mean free path of the gas. As a preferred condition for this invention, the mean free path of the gas is $0.3 \times 10^{-6}$m. during treatment. This is about half the diameter of the smallest cavity capable of containing a Salmonella. From this, it can be anticipated that the gases can quickly reach all toxic surface microorganisms.

It is true that the vapor pressure within small wetted cavities is reduced by surface tension. However, in a cavity large enough for a Salmonella, this effect is negligible.

Although ordinary steam, for example, may reach and kill each surface bacterium, it may not do so before the sub-surface of the meat has received a cooking heat dose. To accomplish surface treatment without interior involvement, the gas must reach the surface very rapidly.

Gas approaches a surface in one or the other of two possible modes: Streaming or diffusion. Of these, streaming is very rapid and is motivated by pressure gradient. The other mode, diffusion, is much slower and is motivated by the concentration gradient of the gas through other gases.

During gas treatment, air, or any other non-condensible gas present, would concentrate near the treated surface as a result of being pushed up to this surface by the in rush of condensing steam, or reacting gas. This air would quickly form a layer near the surface. Additional gas must then diffuse through this layer; since it cannot stream through it. The time taken for a killing dose of gas to reach the target organisms is therefore strongly dependent on the quantity of non-condensible gases which may be between the treating gas and the target.

These interfering non-condensible gases can arise from three sources: Those which had been around the meat in its treatment chamber, those which had been present in the treatment gas, and those which had been desorbed from the meat or other surfaces. The present invention is directed at reducing each of these three sources of intervening non-condensibles.

The air around the meat before treatment is reduced by first exposing the meat to a vacuum, preferably 0.5 psia, or less. See FIG. 2B. To achieve this practically, it is necessary to enclose the meat as tightly as possible in a chamber. This chamber is then opened to a much larger vacuum receiver which is kept at the lowest workable absolute pressure.

To further reduce the air around the meat, it is necessary to flush the meat in its evacuated treatment chamber with air-free gas. For steam, this must be done at a pressure below that which could produce a cooked effect if prolonged. To do this conveniently, one form of the present invention proposes to move the treatment chamber from the vacuum receiver opening to the gas treatment opening, through an arc at the midpoint of which the chamber is slightly open to both the vacuum and gas supply simultaneously. This is shown in FIG. 2C. Furthermore, the chamber is so shaped as to promote good circulation of the flushing gas around the meat during this stage of the operation.

The meat, though closely fitting the chamber, should be loose enough therein to permit good gas flow on all sides. Preferably, the chamber moves in such a way, relative to gravity, and at such an angular acceleration, that the chamber walls do not continuously obscure any one part of the meat surface from the gas.

For steam treatment, entrained air is minimized by using only steam from well boiled water. Such steam can be obtained from a reboiler. Any process steam can be condensed within the tubes of the reboiler, the shell of which is supplied with air-free water. Of course, the same result can be achieved more simply by boiling normal water for an adequate time in the reboiler, discarding the steam so generated, before directing the steam, now air-free, into the surface treatment device. Similarly, for every treatment gas, specific chemical or physical methods are available to insure removal of air, water, or other impurities.

In every case, the gas supply should be connected to the device with the shortest and widest possible ducting. This is particularly necessary for steam treatment in order to avoid superheat. Superheated steam can condense only after it has been cooled to saturation temperature. Such cooling is much slower than condensing. Hence, the present invention avoids superheat. Likewise, entrained liquid water, though less damaging, should be removed from the flowing steam by, for example, an impingement/centrifugal separator.

To reduce gas evolution from the meat, any water wash used on the meat prior to surface pasteurization, or at least the final such wash, should be gas free water, not water containing dissolved gas, such as air or chlorine. The gases desorbed from the meat can be minimized further by exposing the meat first to vacuum, and then to a gas flush. In the case of steam, the flush slightly heats the meat surface. Most of the gases desorbed from the meat leave at first heating; hence they leave with the flush, only after the flush, should the meat be exposed to the pasteurizing treatment itself.

To reduce further the gases evolved from the meat during pasteurization, heating the meat must be minimized by very short treatment duration, through the methods herein described. This is consonant with the objective of the invention to avoid a deep cooked appearance of the meat. In these ways, the interference by non-condensible gas can be very much reduced.

The essence of the process is precise control of the treatment dose. Therefore, after treatment, the treating agent must be removed nearly as rapidly as it had been applied. This is accomplished by exposing the chamber after treatment to the same vacuum used to evacuate the chamber prior to treatment.

In the case of steam treatment, this has the effect of cooling the meat surface back down nearly to the temperature at which it began the treatment. This is an inevitable consequence of re-evaporating all the water formed on the meat surface by the condensing treatment steam. In this way, nearly the same quantity of heat is removed as has been added. Furthermore, in the absence of much condensate run down, the heat is removed from precisely the same regions on the meat to which the heat had previously been added. The result is that the surface has been uniformly heated, and then the same surface has been uniformly cooled nearly to its original temperature; all within a short time, without much heat reaching the interior of the meat.

In the case of a treatment gas other than steam, the reaction at the surface can be abruptly ended by evacuation, as proposed for steam; just as streaming has been shown essential to rapid treatment onset; so it is almost equally important to rapid treatment termination. The reason is the same; the departing gas molecules, like the arriving molecules, must not be forced to diffuse slowly through a stagnant gas layer.

Roughly the same reactions are needed to kill bacteria by heat as are needed to cook the meat. These are the inactivation of the enzyme proteins in bacteria versus the denaturation of the muscle proteins in the meat. Inactivation and denaturation consist of irreversibly cross-linking the proteins' constituent amino acids in new and disorderly ways so that the exquisite molecular configurations necessary for functionality are lost.

However, the inactivation of the most sensitive vital enzyme is enough to kill the organism, typically the heat of activation for such inactivation reaction is 2-12 kcal/g-mol. On the other hand, to denature the muscle protein to give a cooked appearance, much of the entire protein mass near the surface must be affected. Typically, the heat of activation for such a reaction is 50-100 k cal/g mole. Hence about twelve times as much heat must be absorbed by one mole muscle protein, compared to one mole of bacterial enzyme for killing and cooking to be equally complete.

Only micrograms of enzyme need be inactivated for killing, contrasted with grams of muscle which need to be denatured for cooking. So, if the heating rates of meat and microorganisms were equal, the bacteria would die earlier than the meat would cook. For a square centimeter of surface heavily contaminated with one hundred bacteria, fifteen million times as much heat is needed to cook the surface to a depth equal to the length of a bacterium; compared to the heat needed to kill all the bacteria themselves.

Furthermore, the bacteria in question are exposed on the surface; whereas much of the muscle which must be denatured for cooked appearance lies slightly below the wet meat surface. The rate of heating below the surface is proportional to the heat conductivity of the meat. The more rapid convective heat transfer cannot occur because of the cellular nature of the meat. Heat conduction in the body of the meat is thus very much slower than surface heating by steam condensation.

The same reasoning applies to the pasteurizing gases which rely on chemical disruption of the microbial enzyme. They too, must arrive abruptly, treat quickly, and depart rapidly, in order to prevent changes in the meat itself.

Using these stratagems, the present inventor has found that meat can be so rapidly exposed to a gaseous pasteurizing agent that no deep changes occur in the meat, yet the meat is adequately surface pasteurized.

II. The Preferred Apparatus.

In FIG. 2, clearances between stator and rotor 10 are exaggerated for clarity.

With reference to FIGS. 3, 4, 5 and 6, one device that may be used in accord with the present invention is comprised of a stator containing a cylindrical rotor 10. Means are provided to turn the rotor 10 very rapidly around its horizontal axis to precisely determined angular positions. In this description, the motion of rotor 10 may be spoken of as intermittent. In actual practice, the rotor 10 may turn in a steady motion. Within the rotor 10, there are one or more treatment chambers 12, have radial sides and round bottoms. The rotor 10 may be fitted with interior channels for cooling water flow. A small duct at the bottom of the chamber(s) can be connected through the rotor shaft to vacuum or, alternatively, to filtered room air. This duct would open only when the chamber 12 is at the removal/insertion position.

The desired volume of the chamber determines the diameter of the rotor. For a double treatment stator, for example, with a chamber volume of one gallon (adequate for a whole broiler chicken), the rotor must be 10 inches in diameter, 12 inches long.

A single treatment stator is provided with one opening to air, two to vacuum, and one to treating gas. See FIGS. 2A-2E. These are arranged around the stator so that the net pressure forces acting on the rotor 10 are balanced as nearly as possible. The connections to vacuum and to gas are such that no part of the connections are of smaller cross-sectional area than that of the rotor chamber 12, and are each as short as possible. The positions around the stator, in terms of the function of each are: removal/insertion (open to air), closed, vacuum, flush (slightly open to both vacuum and gas), gas treatment, closed, vacuum, closed, and removal/insertion again. See FIGS. 2A-2E.

A double treatment stator consists of removal/insertion, closed, vacuum, flush, gas treatment, closed, vacuum, closed, gas treat, closed, vacuum, closed, and back to removal/insertion. In this version, the two exposures to gas should be located on opposite sides of the stator so that gravity is reversed within the rotor chamber between treatments.

The rotor 10 fits inside the stator so that there is minimal leakage across the segments called closed, except as described below under the heading "Steam Flush". This separation function may optionally be achieved by a separate assembly of sealing bearings attached to the stator.

FIGS. 7, 8, 9 and 10 illustrate specific configuration and structural details of an embodiment of an apparatus designed in accordance with the present invention.

III. The Preferred Process

A. Starting Materials

Besides fresh meat, various other solids may advantageously be surface treated in accordance with the present invention. Separation membranes, for example, may be treated to yield good separations at high permeation rates. Or temperature and moisture sensitive materials, such as wax paper, can be sterilized. In different embodiments, the word meat can be defined to include other materials needing surface treatment; and the word steam can be defined to include other treatment gases.

Meat entering the pasteurizer should be free of puncture wounds. Of course, the pieces should also fit the treatment chamber fairly closely. Unless spacers are used, the meat must have just enough room to move slightly within the chamber as the chamber is accelerated around its orbit. This is intended to expose all surfaces of the meat during treatment.

B. Insertion

Figure 2A:
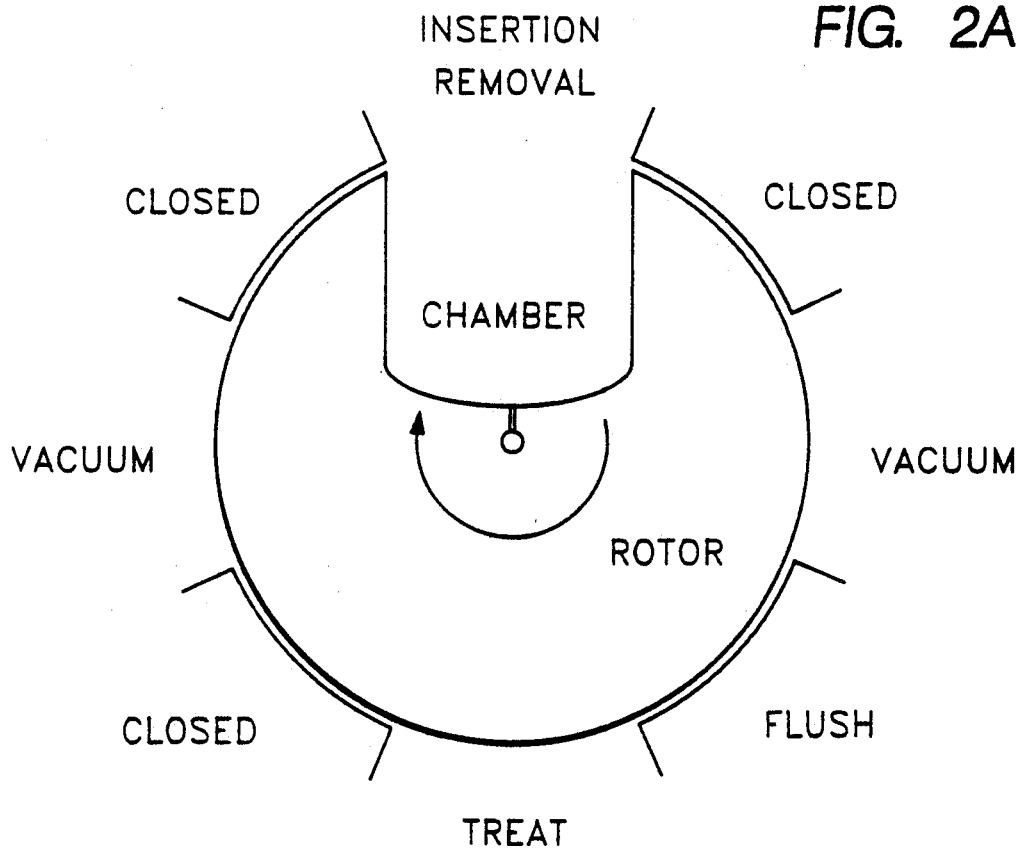
FIGS. 2a, 2b, 2c, 2d, and 2e are schematic representations of a preferred meat treating apparatus at various stages throughout the present meat treating; process.
Figure 6:
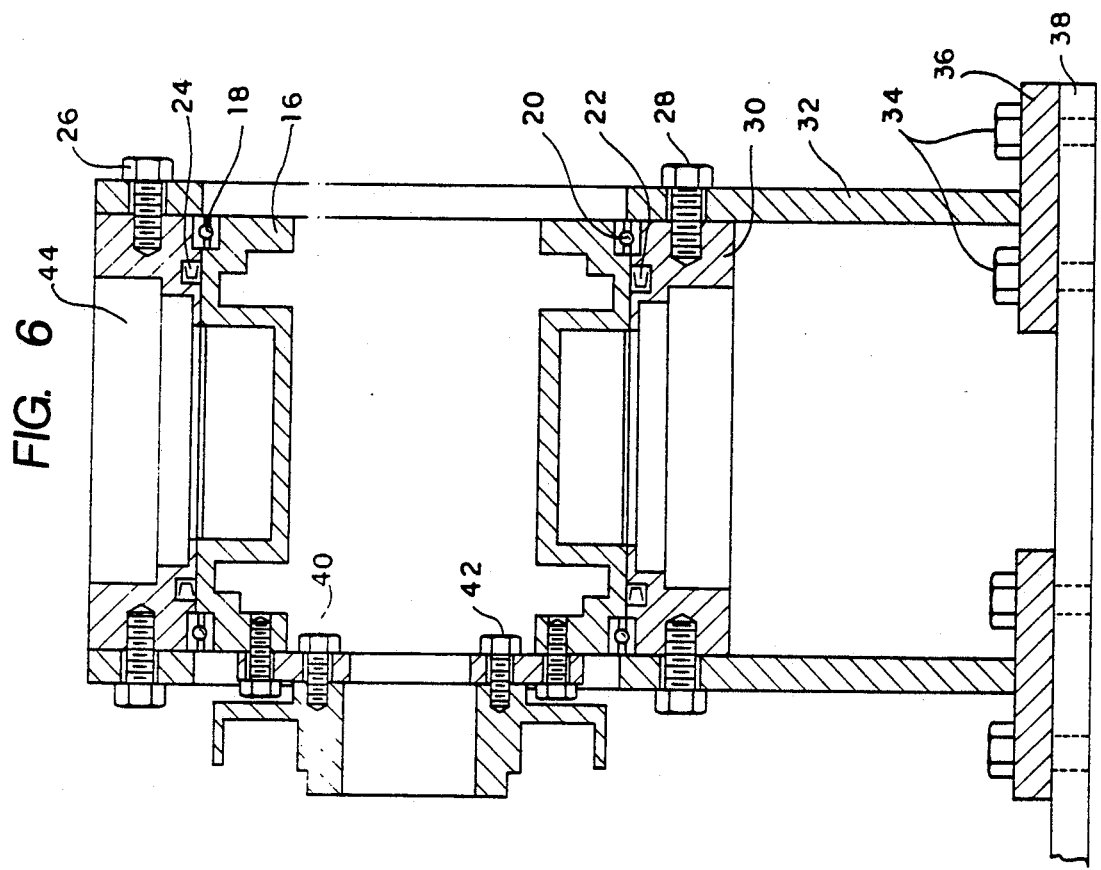
FIG. 6 is a lateral cross-sectional view of the preferred meat treating apparatus in accordance with the present invention.
Figure 5:
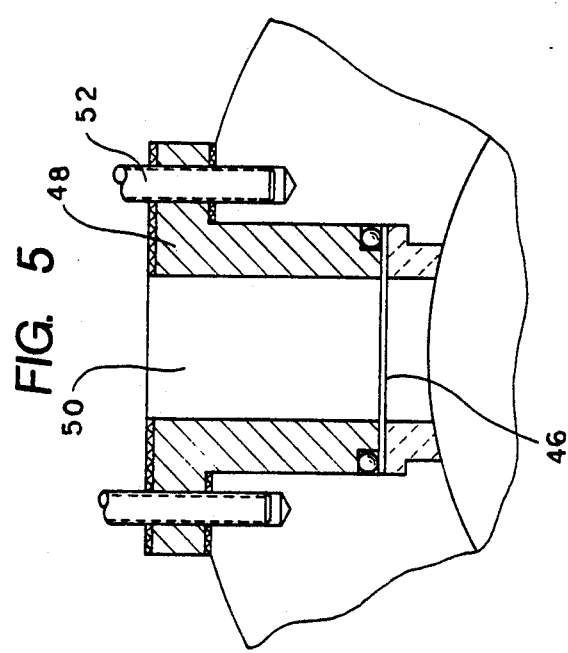
FIG. 5 is an environmental top-view of the chamber insertion area of the preferred meat treating apparatus.
Figure 7:
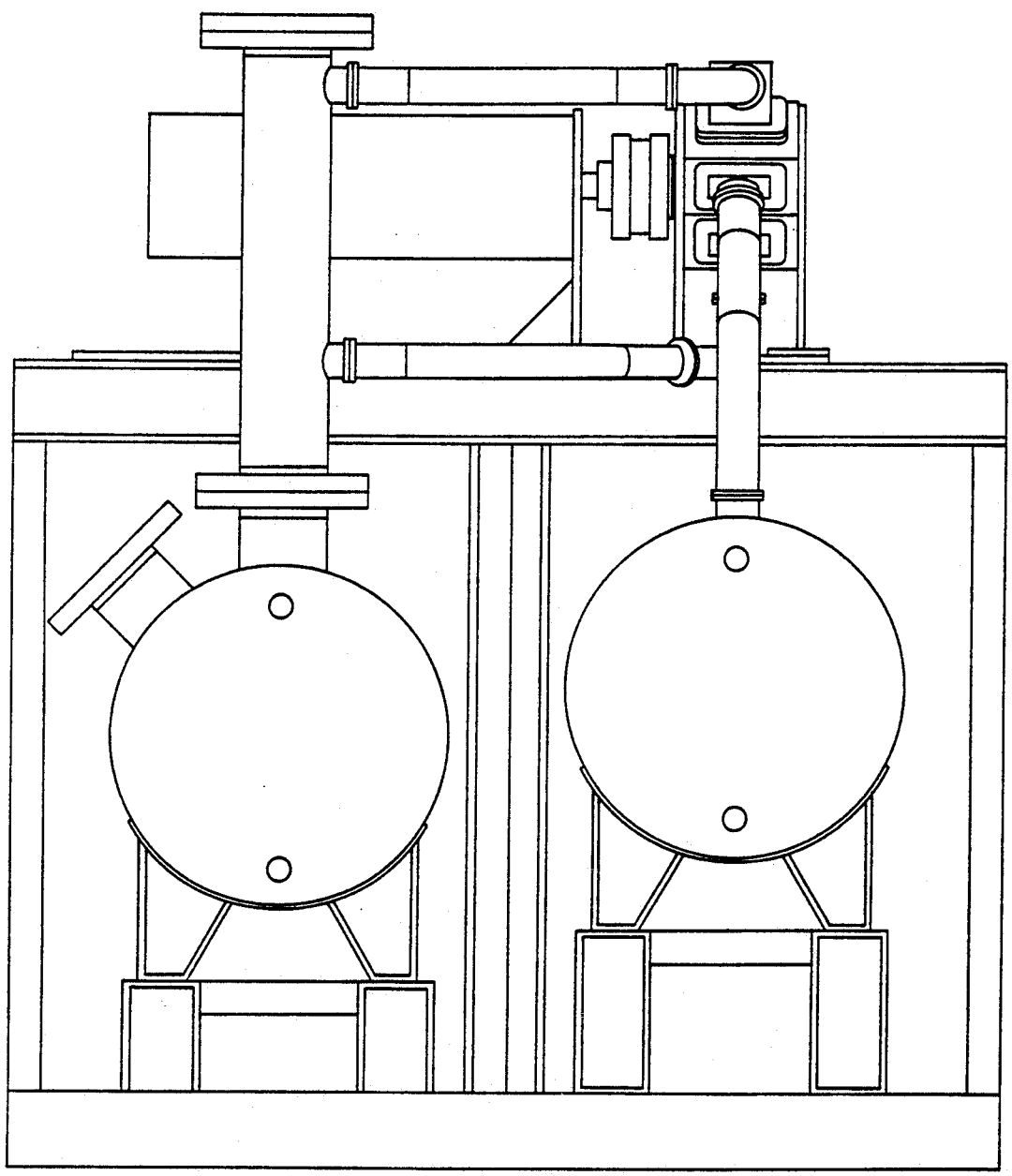
FIG. 7 is a lateral side view of an embodiment of the present invention.
Figure 8:
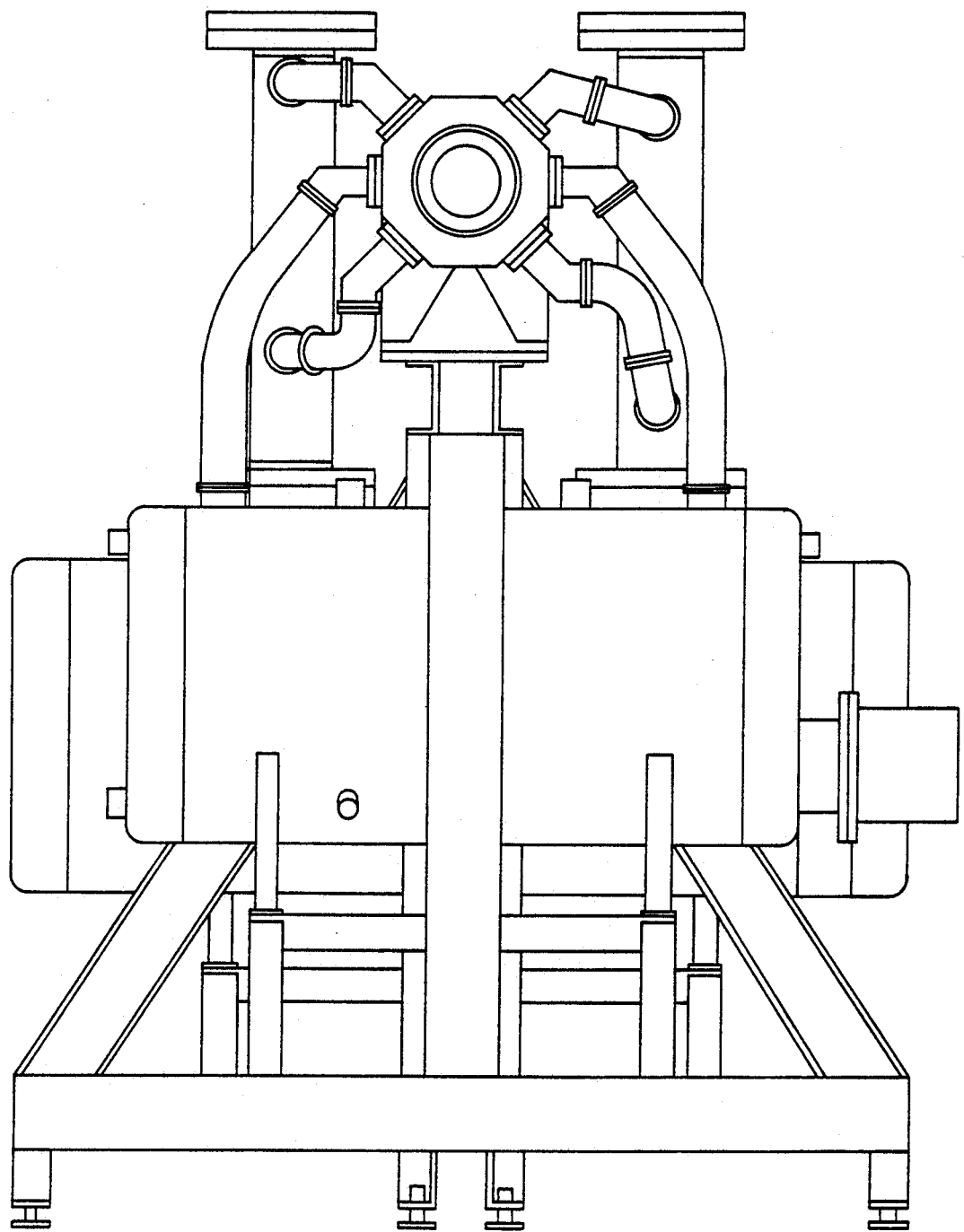
FIG. 8 a front view of the embodiment of the present invention depicted in FIG. 7.
Figure 9:
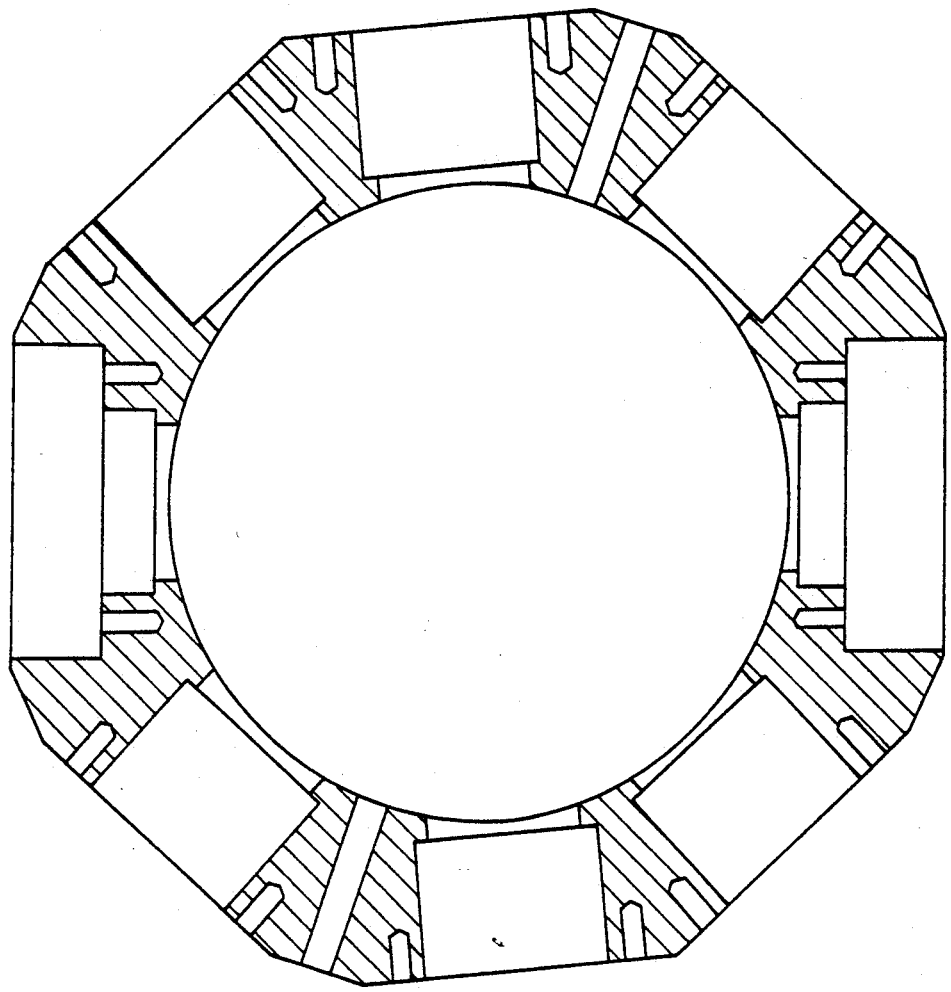
FIG. 9 is a cross-sectional top view of treatment chambers in accordance with the embodiment of the present invention depicted in FIG. 7.
Figure 10:
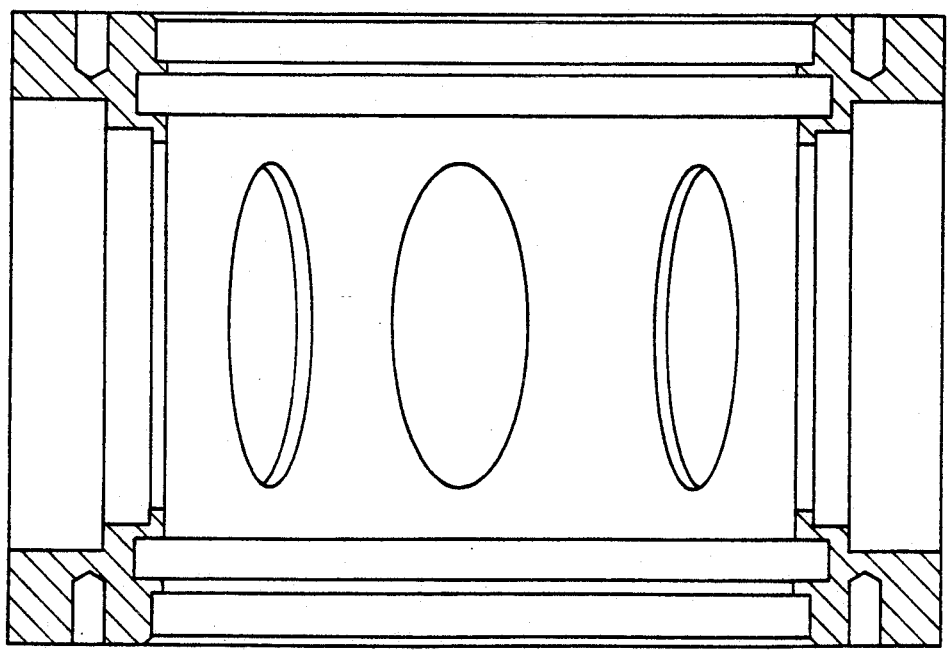
FIG. 10 is a cross-sectional top view of interior components of the embodiment of the present invention depicted in FIG. 7.

With reference to FIGS. 2A, 5 and 6, meat is first inserted into the chamber 12 through stator opening 44. At the insertion rotor position, after ejection of the previously treated pieces, a piece of film, such as saran, is applied to the stator opening 44. This film is drawn as a liner into the chamber by applying a vacuum to a bottom duct 3. The piece of meat is then inserted into the lined chamber. The meat must be restrained within the chamber 12 so that it does not emerge from the chamber 12 or touch the stator until the rotor 10 reaches the removal position.

C. Evacuation

Figure 2B:
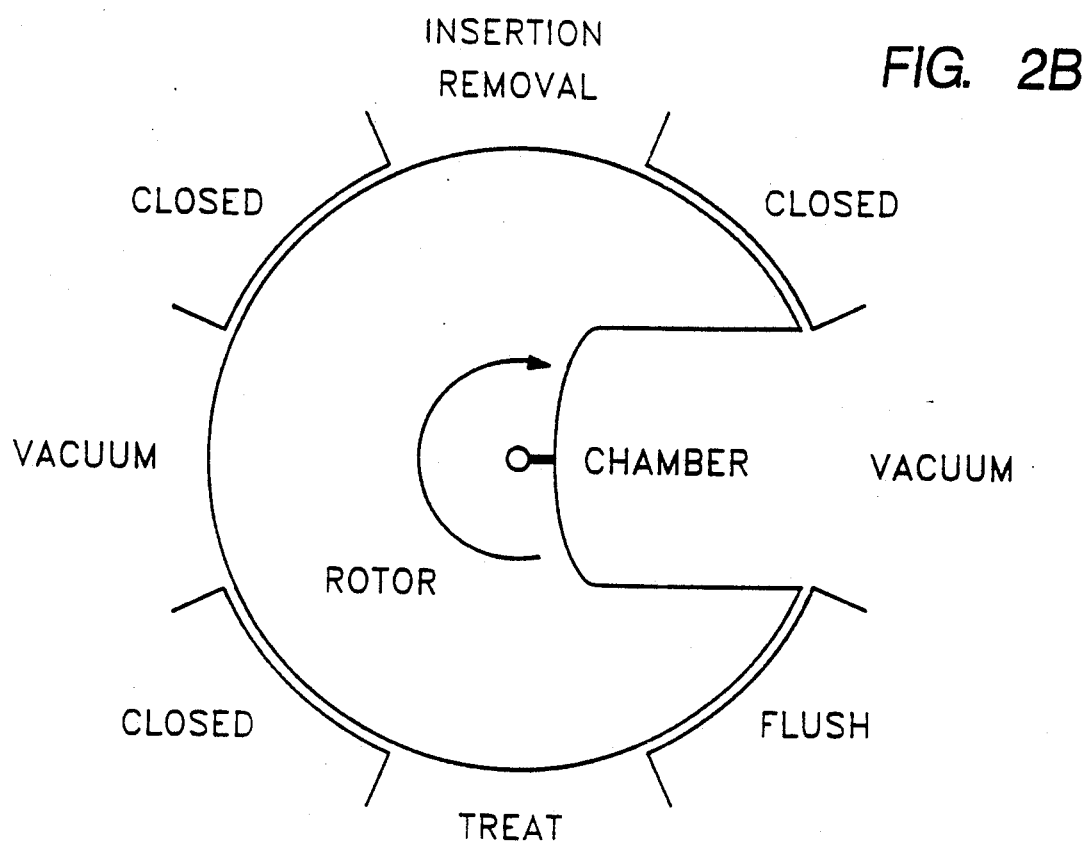
Figure 2C:
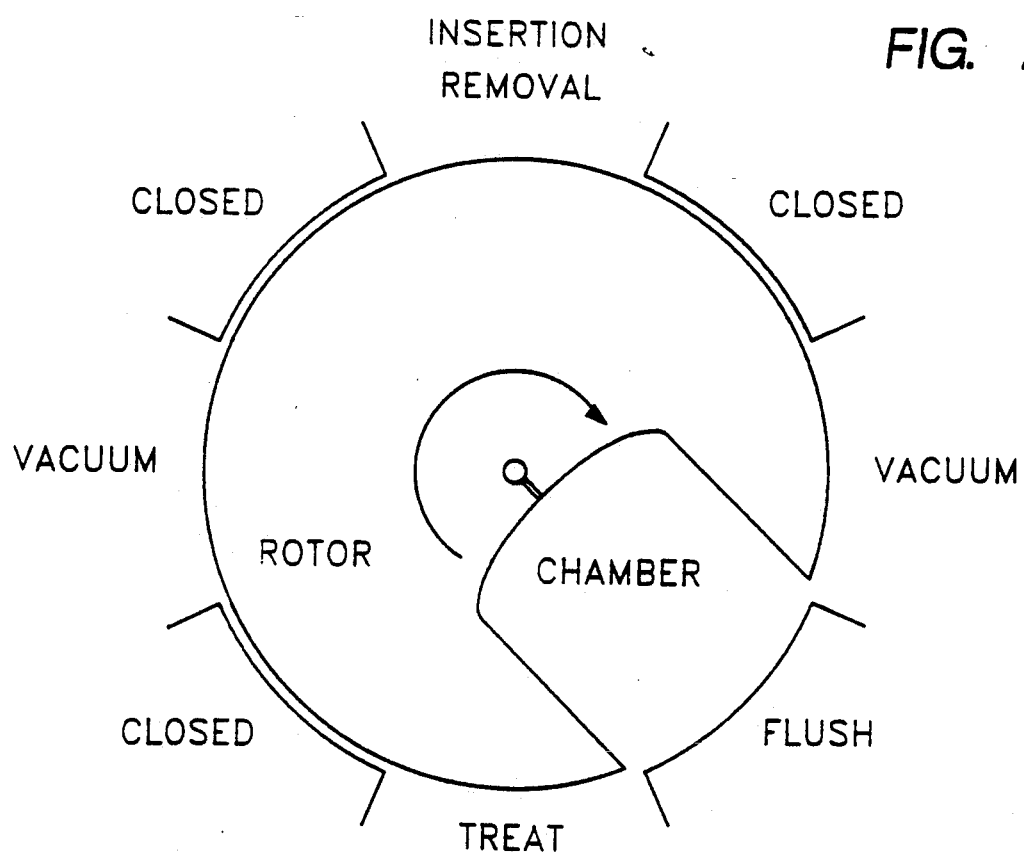

With reference to FIGS. 2A-2E, 5 and 6, the chamber 12 then rotates through an angle sufficient to end its exposure to the insertion atmosphere. As shown in FIG. 2B, it then rotates through an angle so that it is open to the path leading to the vacuum receiver. It remains open to vacuum long enough for the air content of the chamber 12 to be reduced nearly to the vacuum pressure. This time can be calculated by assuming the gas flows at sonic velocity through the stator opening at the vacuum pressure. Since the pressure reduction will immediately start to cool the meat, the rotor 10 must stay in this position no longer than necessary. The preferred vacuum is about 0.5 psia which is the pressure of the saturated pure steam at 80° F.

D. Steam Flush

With reference to FIGS. 2C, 5 and 6, the chamber 12 then rotates through an angle such that the chamber bridges the closure between the vacuum opening and the steam opening on the stator. This position is calculated to provide open gaps to both vacuum and steam about one millimeter wide. A round bottom of the chamber 12 causes the flush to circulate completely around the meat, and back out into the vacuum.

This steam flush entering the vacuum receiver could place a heavy burden on the vacuum steam. Therefore a condensing subsystem may be inserted into the receiver, the subsystem may be a spray of cold water, or a coil inside of which cold water circulates. If the spray is used, the combined condensate and cooling water can either be pumped out to room pressure; or they can flow down through a vertical atmospheric leg to a hot well. If a cooling coil is used, the condensate dripping off its surface can be pumped out of the receiver/condenser. The treatment chamber 12 does not produce more than 0.3 psi momentary pressure rise within the receiver, assuming that the condenser accommodates the flush.

E. Treatment

Figure 2D:
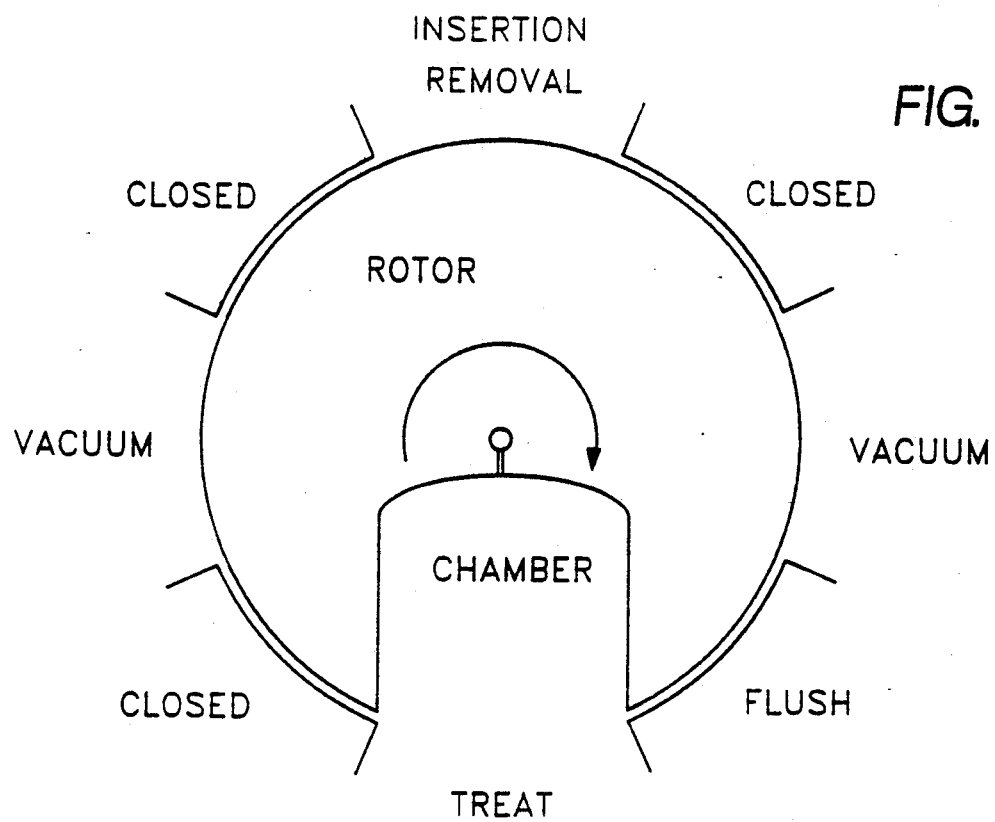

With reference to FIGS. 2D, 5 and 6, the chamber 12 then rotates through an angle such that it is closed to the vacuum, and open to the steam reservoir, in which very pure saturated steam is maintained. This steam is generated in the reservoir by prolonged boiling of a pool of pure water within the reservoir, by means of heat transferred to the pool from a submerged electric or steam heater controlled by pool temperature. The reservoir/reboiler steam pressure is better controlled by a valve in a line from the steam source to the vacuum condenser when the treatment temperature is below 212° F.

F. Cooling

Figure 2E:
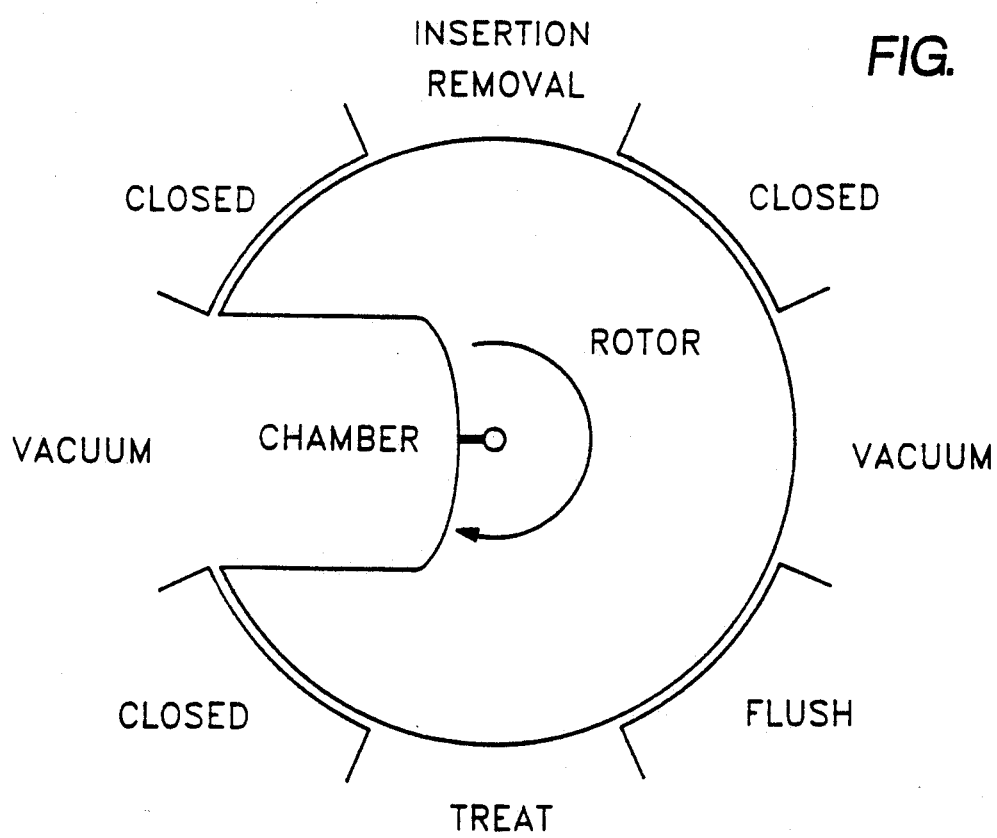
Figure 4:
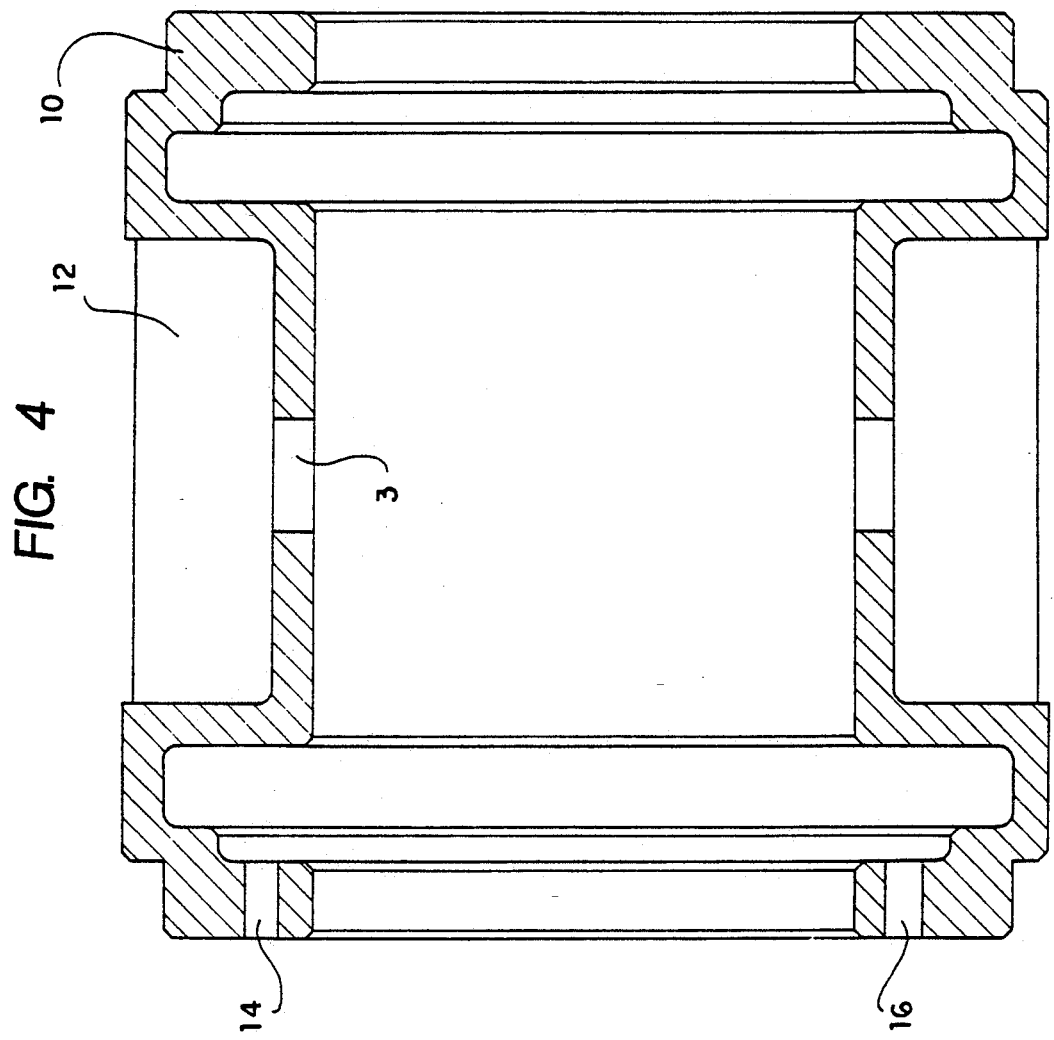
FIG. 4 is a lateral cross-sectional view of the internal rotating chamber of the preferred meat treating apparatus.
Figure 3:
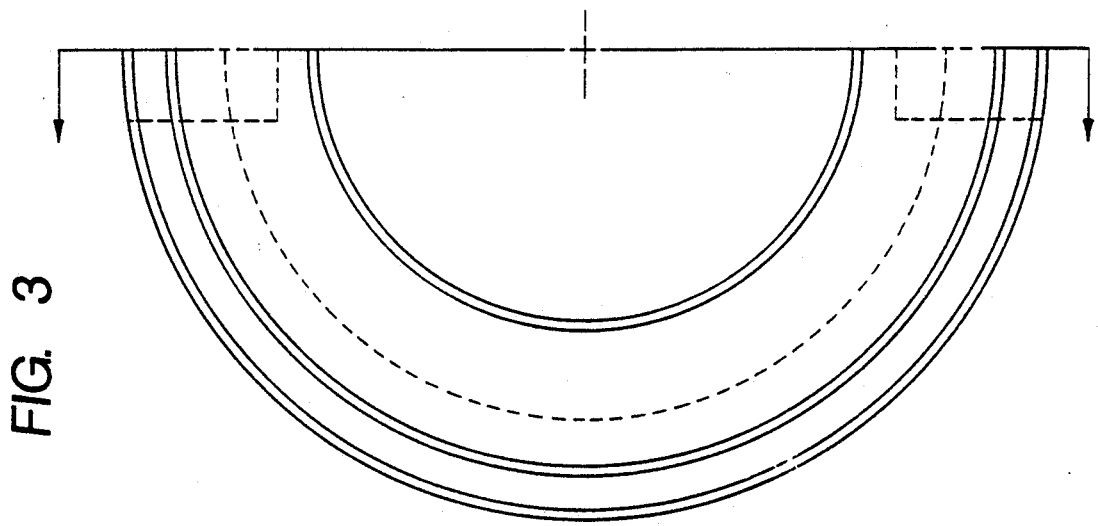
FIG. 3 is a partial end view of a preferred meat treating apparatus.

With reference to FIGS. 2E, 5 and 6, the chamber 12 then rotates through an angle such that the opening of the steam reservoir/reboiler is closed, it then rotates through an angle such that it is open again to the vacuum receiver/condenser. This allows the steam treatment to be ended abruptly; and for very rapid evaporative cooling to take place. For a vacuum maintained at 0.5 psia, the surface cooling will proceed nearly to 80° F., at which point all the condensate added to the meat in the pasteurizing step has been removed.

G. Cycle Repetition

To maximize the efficacy of the treatment in certain situations, it may be preferable to repeat the steam treatment after the first cooling. The complete cycle of evacuating, flushing, pasteurizing, and cooling may repeated as often as necessary. If meat pieces are treated several times and at varying angular positions, it is more unlikely that any individual area of the meat surface will be left untreated.

For example, it is noted that while bacterial contamination occurring during meat processing is nearly always limited to the meat surface. If the surface of the meat is broken or otherwise punctured during slaughter, surface-residing microorganism can be displaced internally into the meat beneath the immediate surface area. Such surface breakage and punctures normally do not occur when slaughtering and processing is conducted with care. Whenever such surface lesions do occur, the present invention should be carried out more slowly, carefully, and repeatedly, to insure that any displaced sub-surface microorganisms are treated and killed.

H. Removal

At the end of the previous cycle, after final vacuum and closed steps, the chamber is rotated through an angle such that it is returned to the initial "insertion" position shown in FIG. 2A. Over the opening is stretched another piece of sterile film, such as gamma ray sterilized saran, or the like. The air pressure pushes the film into the chamber on top of the meat piece, forming a cover wrap for the meat piece which has just been treated. Air then flows through the bottom duct of the chamber, ejecting the liner and the treated and, now, fully wrapped piece. The chamber is now ready for a new cycle.

EXAMPLE 1

Thirty grams of fresh broiler chicken boneless breast meat was cut to fit the treatment chamber of FIG. 2 This meat had a pink, partly translucent appearance, typical of raw white poultry meat. The meat sample was painted with a suspension of *Listeria innocua*, a harmless corynebacterium resembling *Salmonella typhii* in size, shape, and thermal resistance. The suspension was analyzed and found to contain 10,000 ($10^4$) living microorganisms per gram.

The contaminated piece was inserted into the device shown in FIG. 2 and then exposed to the process shown in FIG. 1. The conditions were the following:

| Step | Duration | Conditions |
| --- | --- | --- |
| Vacuum | 1.0 second | 00.3 psia |
| Flush | 0.3 second | |
| Treat | 1.0 second | 30.0 psia (steam) |
| Vacuum | 1.0 second | 00.3 psia |

The meat sample was removed after treatment and examined. It was found to be about 40° C. and showed no whitened flat surfaces typical of cooked meat. It did show whitened fine protrusions and sharp edges. A sterile peptone water solution was used to wash the treated sample. An untreated control was likewise washed with the same solution. The peptone-water rinse from each sample was saved, then plated onto triptose agar, and subsequently counted. The untreated control contained $10^4$ colonies, whereas the treated sample revealed only $10^0$ colonies.

EXAMPLE 2

Again, as in Example 1, thirty grams of broiler chicken meat was cut to fit the treatment chamber. Again, the sample was painted with a suspension of *Listeria innoccuans*. The operating conditions were as follows:

| Step | Duration | Conditions |
| --- | --- | --- |
| Vacuum | 1.0 second | 00.3 psia |
| Flush | 0.2 second | |
| Treat | 0.3 second | 40.0 psia (steam) |
| Vacuum | 1.0 second | 00.3 psia |

After treatment, unlike Example 1, the meat sample was found without any areas having a cooked, whitish appearance. The treated and untreated controls were washed with a sterile peptone solution and the rinses plates. Again, $10^4$ colonies were counted in the untreated samples, whereas $10^0$ colonies were counted in the treated samples.

It is to be understood that the present invention is not limited to the embodiments described above, but encompasses any and all embodiments within the scope of the following claims.

I claim:

1. A method for killing microorganisms living on a porously surfaced substance comprising the steps of:
    exposing the porously surfaced substance to a first evacuation to remove a substantial amount of air,
    flushing the porously surfaced substance with a substantially air-free treatment gas to further remove a substantial amount of air,
    treating the porously surfaced substance with the substantially air-free treatment gas for a predetermined time period sufficient to kill microorganisms living on the porously surfaced substance,
    exposing the porously surfaced substance to a second evacuation to remove a substantial amount of the air-free treatment gas.

2. The method of claim 1 wherein the treatment gas is

3. The method of claim 1 wherein the treatment gas is a gas selected from a group consisting of ozone, hydrogen peroxide and propylene oxide.

4. The method of claim 1 wherein the treatment gas is a combination of steam and a gas selected from a group consisting of ozone, hydrogen peroxide and propylene oxide.

5. A process for treating meat in accordance with claim wherein the steps are repeated more than once.

6. The method of claim 1 wherein the porously surfaced substance is poultry meat.

7. The method of claim wherein the porously surfaced substance is seafood meat selected from a group consisting of fish, crustaceans and mollusks.

8. The method of claim 1 wherein the porously surfaced substance is sausage.

9. The method of claim 5 wherein the porously surfaced substance is a separation membrane.

10. The method of claim 1 wherein the pressure of the first evacuation is not greater than 1.0 psia, the pressure of the second evacuation is not greater than 1.0 psia.

11. The method of claim 1, wherein the pressure of the second evacuation is not greater than 1.0 psia.

12. The method of claim 11 wherein the treatment of the porously surfaced substance is at a pressure between 7.0 psia and 30 psia.

13. The method of claim 1 wherein the porously surfaced substance is exposed to the first evacuation for approximately 1.0 seconds.

14. The method of claim 13, wherein the porously surfaced substance is exposed to the second evacuation for approximately 1.0 seconds.

15. The method of claim 14, wherein the porously surfaced substance is flushed with the substantially air-free treatment gas for approximately 0.3 seconds and treated with the substantially air-free treatment gas for approximately 1.0 seconds.

16. The method of claim 14, wherein the porously surfaced substance is flushed with the substantially air-free treatment gas for approximately 0.2 seconds and treated with the substantially air-free treatment gas for approximately 0.3 seconds.

17. The method of claim 10 wherein the step of treating the porously surfaced substance further comprises treating the porously surfaced substance at a pressure between 7.0 psia and 30 psia.

18. An apparatus for killing microorganisms living on a porously surfaced substance comprising:
first vacuum means for exposing the porously surfaced substance to a first evacuation to remove a substantial amount of air;
flushing means for flushing the porously surfaced substance with a substantially air-free treatment gas to further remove a substantial amount of air;
treating means for treating the porously surfaced substance with the substantially air-free treatment gas for a predetermined time period sufficient to kill microorganisms living on the porously surfaced substance;
second vacuum means for exposing the porously surfaced substance to a second evacuation to remove a substantial amount of the air-free treatment gas.

19. The apparatus of claim 18, further comprising a stator and a rotatable chamber, said rotatable chamber having access means;
said stator having an insertion means;
said first vacuum means, said flushing means, said treating means, said second vacuum means and said insertion means
being disposed on said stator;
said rotatable chamber being intermittently rotatable inside said stator such that said access can independently contact said first vacuum means, said flushing means, said treating means, said second vacuum means and said insertion means.

20. The apparatus of claim 19, wherein said flushing means is a zone on said stator where said access contacts said first vacuum means and said treating means simultaneously.

* * * * *